(12) United States Patent
Green et al.

(10) Patent No.: US 6,390,484 B1
(45) Date of Patent: May 21, 2002

(54) VEHICLE SUSPENSIONS

(75) Inventors: Phillip James Green, Nuneaton; Mark Pask, Bromsgrove; Richard Ian Sander, Leamington Spa, all of (GB)

(73) Assignee: Land Rover Group Limited, Jersey (GB)

( * ) Notice: Subject to any disclaimer, the term of this patent is extended or adjusted under 35 U.S.C. 154(b) by 0 days.

(21) Appl. No.: 09/622,019

(22) PCT Filed: Jan. 28, 1999

(86) PCT No.: PCT/GB99/00300

§ 371 Date: Sep. 18, 2000

§ 102(e) Date: Sep. 18, 2000

(87) PCT Pub. No.: WO99/41096

PCT Pub. Date: Aug. 19, 1999

(30) Foreign Application Priority Data

Feb. 11, 1998 (GB) .............................. 9802890

(51) Int. Cl.[7] ............................................ B60G 21/073
(52) U.S. Cl. .............................. 280/124.106; 280/5.507; 280/124.134; 280/124.16; 280/124.161
(58) Field of Search .................. 280/124.106, 124.134, 280/124.157, 124.16, 5.5, 5.507, 5.508, FOR 159, FOR 168, 124.161, FOR 146

(56) References Cited

U.S. PATENT DOCUMENTS

| | | | |
|---|---|---|---|
| 2,843,396 A | 7/1958 | Lucien | |
| 3,328,019 A | 6/1967 | Wilson | ........................ 267/11 |
| 4,050,704 A | 9/1977 | Duca et al. | |
| 5,566,970 A | 10/1996 | Lin | |

FOREIGN PATENT DOCUMENTS

| | | |
|---|---|---|
| FR | 1 312 958 A | 4/1963 |
| GB | 889937 | 2/1961 |

OTHER PUBLICATIONS

Japanese Abstract, vol. 012, No. 052 (M–668) dated Feb. 17, 1988 & JP 62 199517 A to Kayaba Ind. Co. Ltd., dated Sep. 3, 1987.

Primary Examiner—Eric Culbreth
(74) Attorney, Agent, or Firm—Davis & Bujold, P.L.L.C.

(57) ABSTRACT

A vehicle suspension system includes a hydraulic anti-roll mechanism in which a pair of suspension arms (10a, 10b), on opposite sides of the vehicle, are mounted to the vehicle body pivots (16a, 16b). A pair of hydraulic struts (22a, 22b) are connected between the suspension arms and the body (14). The struts are asymmetrically mounted so that one is inboard of its suspension arm pivot and the other is outboard of its suspension arm pivot. The two lower chambers of the struts (22a, 22b), through which the connecting rods (32) of the pistons extend, are hydraulically interconnected, and so are the two upper chambers.

12 Claims, 4 Drawing Sheets

VEHICLE SUSPENSIONS

Figure 1:
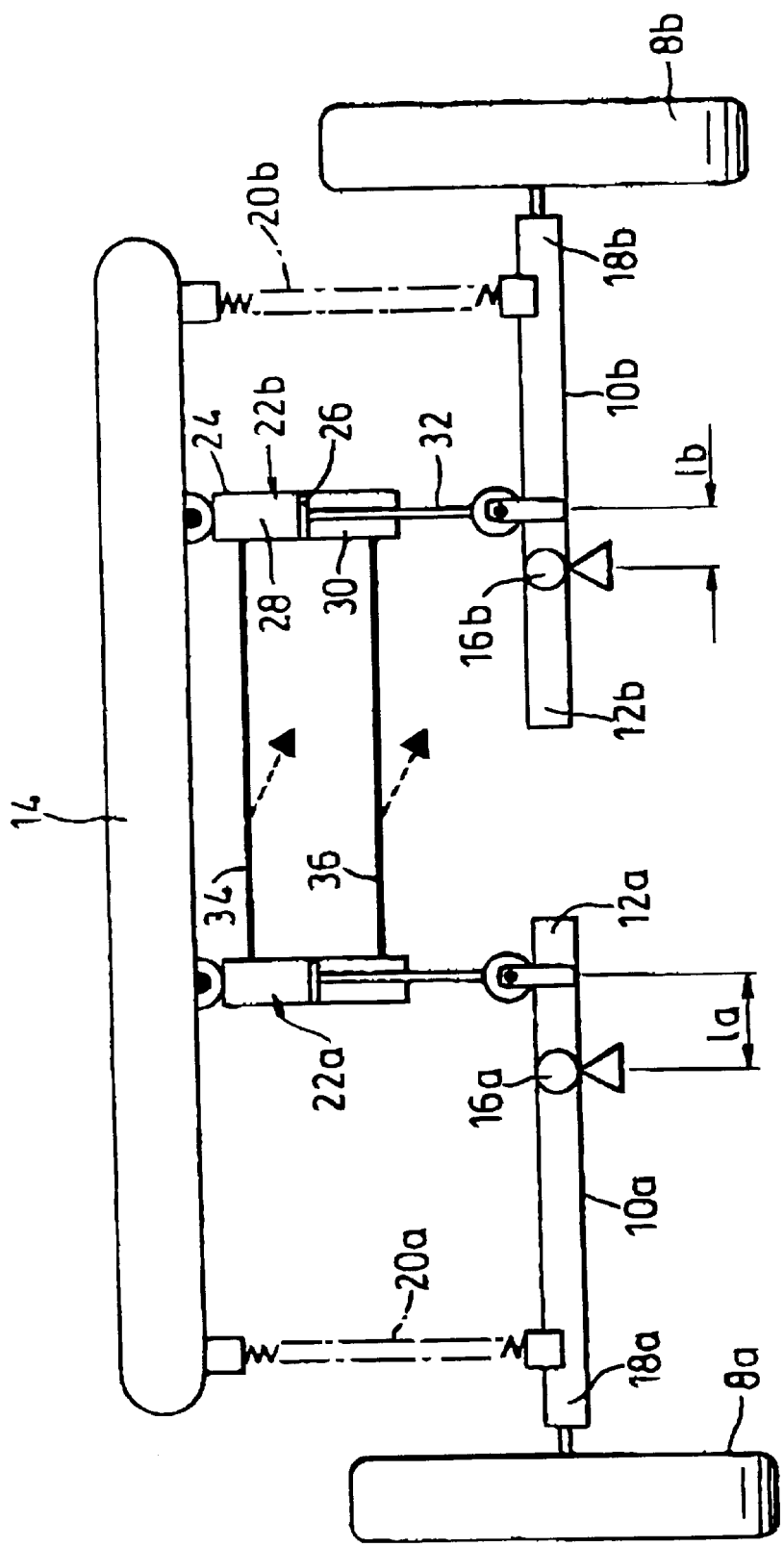

The present invention relates to vehicle suspensions and in particular to the control of vehicle roll.

BACKGROUND OF THE INVENTION

It is known for example from U.S. Pat. No. 4,050,704 to provide a vehicle suspension system in which roll, i.e. rotation of the vehicle about a longitudinal axis parallel to the normal direction of travel, is controlled by means of hydraulic cylinders or actuators.

SUMMARY OF THE INVENTION

The present invention provides a vehicle suspension system comprising a pair of suspension arms for supporting wheels on opposite sides of a vehicle, each suspension arm being pivotably attached to a vehicle body, and a pair of struts each arranged for connection between one of the suspension arms and the vehicle body to control rotation of the suspension arm about its respective pivot thereby to control vertical movement of the respective wheel relative to the vehicle body, wherein each strut comprises a cylinder and a piston which together define a working chamber, the, piston being movable relative to the cylinder to change the volume of the working chamber, the two working chambers are interconnected with each other, the struts are asymmetrically arranged and the cross sectional areas of the pistons and the distances between the struts and the respective pivots are arranged such that equal vertical movements of the wheels in the same direction produce equal but opposite changes in volume of the respective working chambers.

Preferably the pistons have equal effective working areas and the struts are connected to the suspension arms at equal distances from the respective pivots. However, provided the product of the working area of the piston and the distance between the pivot axes and the point of attachment of the strut to the suspension arm is the same on each side of the vehicle, equal wheel movements on each side of the vehicle will result in equal changes in volume of the respective working chambers and therefore equal volumes of fluid displacement on each side of the vehicle.

Preferably each piston has a front side and a back side and is connected to one of the body and the suspension arm by a connecting rod extending from the back side of the piston, wherein the working chambers are on the same side of the respective pistons. This enables identical struts to be used on both sides of the vehicle.

More preferably each piston divides its cylinder into first and second working chambers the two first working chambers having the same effective cross sectional area and being interconnected and the two second chambers having the same effective cross sectional area and being interconnected. This means that some fluid leakage around the piston between the working chambers is acceptable.

Conveniently one of the struts is connected to its suspension arm inboard of its pivot and the other is connected to its suspension arm outboard of its pivot, and the struts are preferably arranged on the same side of the suspension arms and are at least substantially parallel For example both the struts may be arranged to operate in use in a substantially vertical direction and may be arranged above the suspension arms. However it will be appreciated that the orientation of either of the struts can be chosen by choosing the direction at which the part of the suspension arm to which they are attached extends from the pivot. For example one or both of the struts can be arranged horizontally if it acts on a part of the suspension arm vertically above the axis of the respective pivot.

At least one of the pairs of interconnected clambers may be connected to a source of fluid pressure and control means provided to control the flow of fluid to and from said pair of chambers to control actively roll of the vehicle.

BRIEF DESCRIPTION THE DRAWINGS

Figure 2:
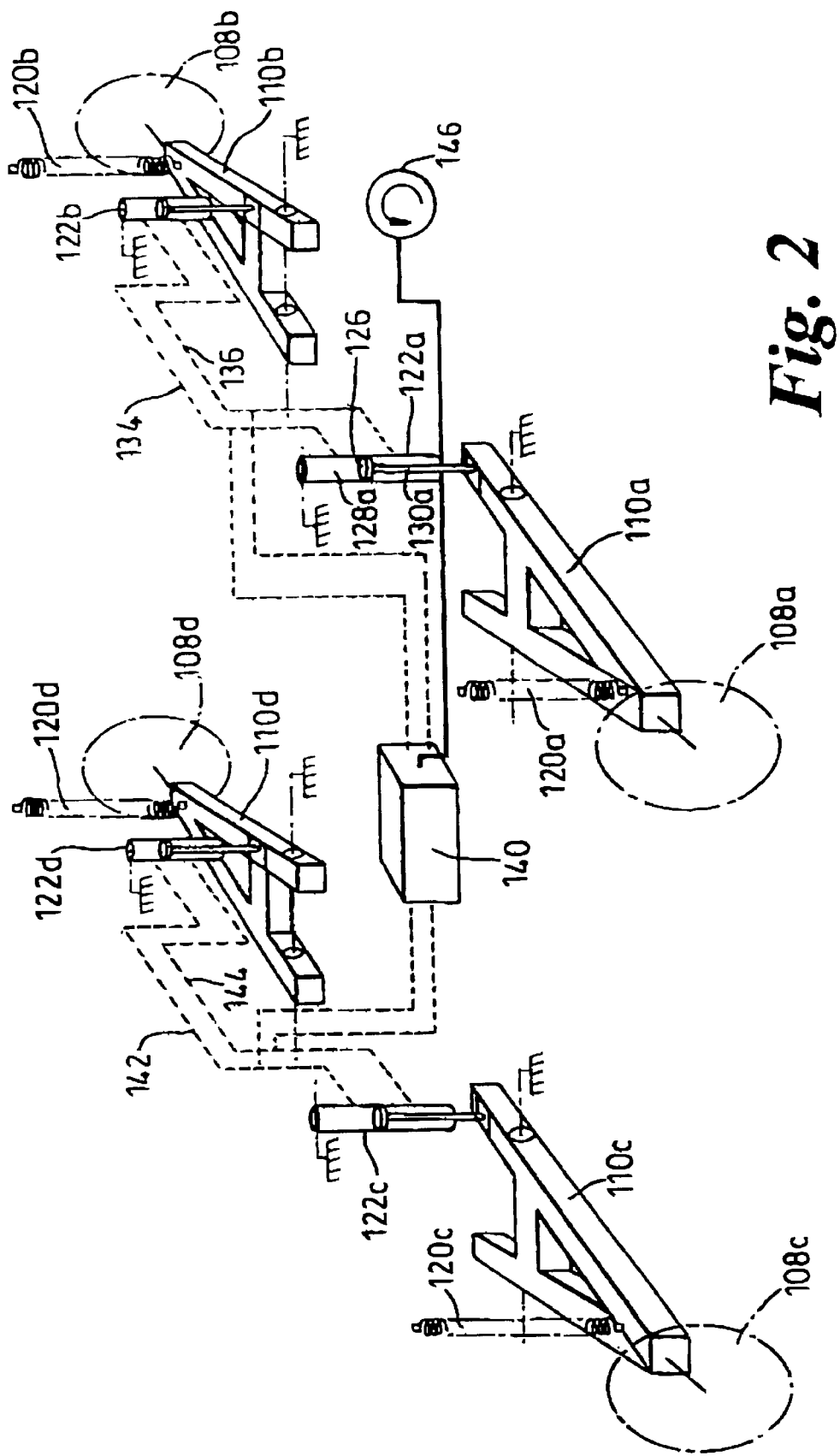
Figure 3:
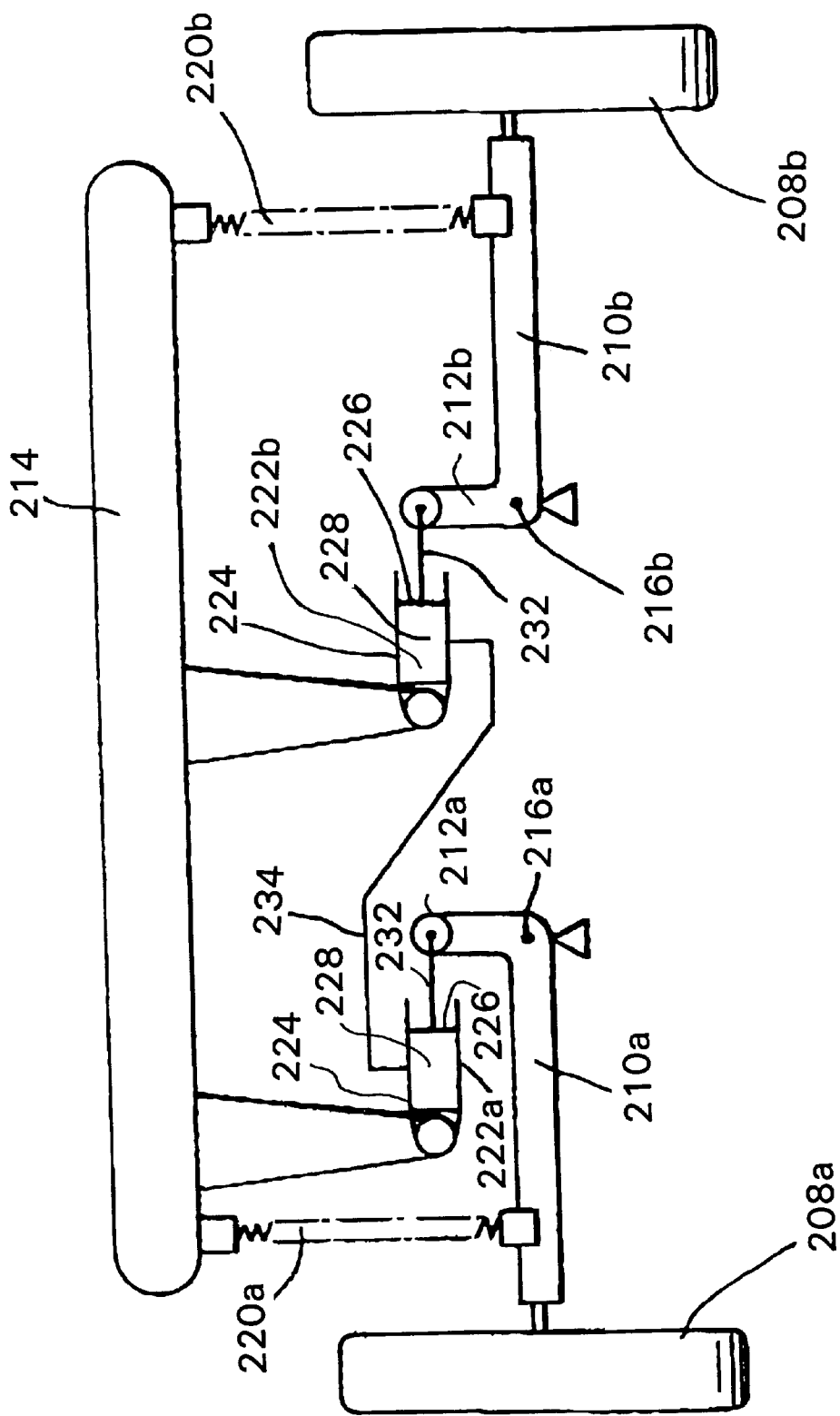
Figure 4:
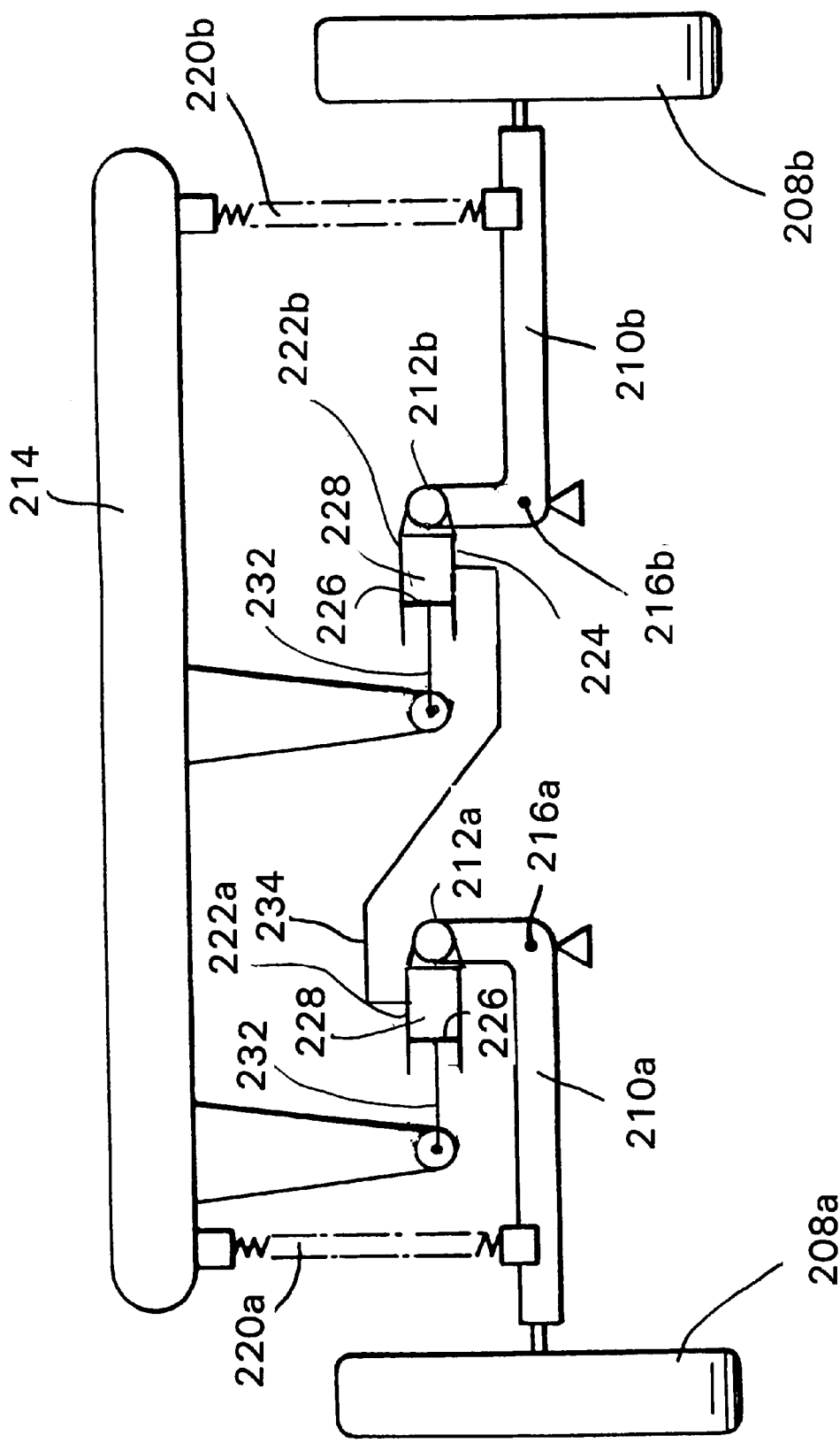

Preferred embodiments of the present invention will now be described by way of example only with reference to the accompanying drawings in which:

FIG. 1 is a diagrammatic representation of part of a vehicle suspension system according to a first embodiment of the present invention, FIG. 2 is a diagrammatic representation of the complete suspension system according to a second embodiment of the invention, FIG. 3 is a schematic diagrammatic representation of part of a vehicle suspension system according to a third embodiment of the present invention; and FIG. 4 is a diagrammatic representation of part of a vehicle suspension system according to a fourth embodiment of the present invention.

DESCRIPTION OF THE PREFERRED EMBODIMENTS

Referring to FIG. 1, a suspension system for the two rear wheels 8a, 8b of a vehicle comprises a pair of suspension arms 10a, 10b, each connected near its inboard end 12a, 12b to a vehicle body 14 by a respective pivoting mounting 16a, 16b about which the suspension arm 10a, 10b can pivot to allow the wheel 8a, 8b mounted at its outboard end 18a, 18b to move vertically relative to the vehicle body 16. Each suspension arm 10a, 10b is also connected to the body 14 by a spring 20a, 20b towards its outboard end 18a, 18b.

The left suspension arm 10a is also connected to the body 14 by a hydraulic strut 22a at its inboard end 12a, inboard of the mounting 16a, and the right suspension arm 10b is connected to the body 14 by an identical hydraulic strut 22b at a point outboard of the mounting 16b. Therefore the points of connection between the struts 22 and the suspension arms are both offset from the axes of the respective pivots in the same direction, in this case to the same side of the vehicle. The distances 1a, 1b between the points of connection of the two struts 22a, 22b and the respective pivots 16a, 16b are the same.

Each strut 22a, 22b comprises a cylinder 24 mounted on the body 14 and a piston 26 dividing the cylinder into a first working chamber 28 above it and a second working chamber 30 below it, the piston 26 being connected to the suspension arm 10a, 10b by means of a connecting rod 32 extending down through the second chamber, and out of the bottom end of the cylinder 24. Each pair of corresponding chambers in the two cylinders is interconnected by a hydraulic pipe, i.e. the two first chambers 28 are interconnected by a first pipe 34 and the two second chambers 30 are interconnected by a second pipe 36, and each of the chambers 28, 30 and the pipes 34, 36 is filled with hydraulic fluid In its simplest form, the hydraulic system described is closed so that fluid can only flow between the two first chambers 28 and the two second chambers 30. The hydraulic system then acts as a simple anti-roll mechanism. If the two wheels 8a, 8b move vertically in the same direction the suspension arms 10a, 10b rotate in opposite directions about their respective pivots 16a, 16b, the two pistons 26 move in opposite directions, one of the struts 22a, 22b expanding and the other contracting, and fluid flows in one direction through the pipe 34 and in the other direction through the pipe 36 and the system provides little resistance to the wheel movement. Because of the asymmetry of the strut mounting arrangement which allows each chamber 28, 30 to be connected to the corresponding chamber on the other strut 22 which has an equal effective cross sectional area, equal movements of the wheels can be accommodated by movement of fluid from one strut to the other.

It will be appreciated that, in order to allow for some simultaneous movement of the two wheels 8a, 8b in the opposite vertical directions, i.e. to allow the vehicle to roll, in the type of closed system described above some mechanism must be provided to allow the combined volume of the two upper chambers 28 and the combined volume of the two lower chambers 30 to change thereby allowing the two struts 22 to expand or contract simultaneously and the suspension arms 10 to rotate in the same direction. This could be done for example by allowing fluid to enter or leave each of the interconnecting pipes 34, 36 as required into suitable accumulators against a resistive force the strength of which would determine the overall resistance of the system to roll.

The arrangement shown in FIG. 1 can also be incorporated into an active roll control system by connecting each pair of interconnected chambers to a source of fluid pressure such as a hydraulic pump via a valve block so that fluid pressure to each pair of chambers can be controlled. Increasing the pressure to the two first chambers 28 will cause the left wheel 8a to rise and the right wheel 8b to drop relative to the body, thereby causing the vehicle to roll to the left, and increasing the pressure to the two second chambers 30 will cause the left wheel 8a to drop and the right wheel 8b to rise relative to the body, thereby causing the vehicle to roll to the right. FIG. 2 shows a suspension system for a four wheeled vehicle according to a second embodiment of the invention in which the rear pair of wheels 108a, 108b and the front pair of wheels 108c 108d are each supported on a suspension corresponding to that shown in FIG. 1.

In FIG. 2 parts of the rear suspension corresponding to those shown in FIG. 1 are given the same number but increased by 100, and parts of the front suspension are given corresponding reference numbers but with the letters a and b replaced by c and d. The hydraulic lines 134, 136 interconnecting the rear struts 122a, 122b , and the corresponding interconnecting lines 142, 144 between the front struts 122c, 122d, are each connected to a valve block 140 which in turn is connected to a hydraulic pump 146. The valve block 140 includes an electronic control circuit which can allow independent control of the roll of the front and the rear of the vehicle.

Whilst roll of the vehicle will require movement of hydraulic fluid between the interconnecting pipes 134, 136, 142, 144 and the valve block, bump and rebound of the front pair of wheels or the rear pair of wheels only requires movement through the interconnecting pipes 134, 136, 142, 144. With the system controlling the front and rear suspensions together and hydraulic interconnection of pipe 134 to pipe 142 and of pipe 136 to pipe 144 through the valve block, the resistance of the system to small scale bump and rebound movements is therefore low which can improve the secondary ride quality of the vehicle whilst maintaining the vehicle roll stiffness.

Referring to FIG. 3, in a third embodiment of the invention each of the suspension arms 210a, 210b is turned upwards at its inboard end so as to form an L-shaped member, supported on a pivot 216a, 216b at the junction between the horizontal part and the vertical part. The top ends 212a, 212b of the vertical parts, which are directly above the pivots 216a, 216b when the vehicle is level, are connected to the pistons 226 of a pair of hydraulic struts 222a, 222b. The struts are horizontal and their cylinders 224 are both pivotably connected to the body 214 to the same side of the respective suspension arm pivots 216. In this example only one hydraulic chamber 228 is shown for each strut, on the opposite side of the piston 226 to the connecting rod 232 to the suspension arm 210a, 210b, and the two chambers 228 are interconnected by a hydraulic line 234. The struts are of equal diameter and are connected to the suspension arms 210a, 210b at equal distances from the axes of the respective pivots 216a, 216b. Clearly the struts could each have two chambers as in the first two embodiments.

In roll each of the suspension arms 210a, 210b rotates in the same direction about their pivots 216a, 216b and the pistons 226 in the struts 222a, 222b therefore move in the same direction. However this tends to either compress or expand the hydraulic fluid in the chambers 228 and line 234 and is therefore resisted. On the other hand, in bounce, when the suspension arms 210a, 210b rotate in opposite directions about their pivots 216a, 216b and the pistons 226 in the struts 222a, 222b therefore move in opposite direction, the wheel movement can be accommodated by movement of fluid from one strut to the other.

Referring to FIG. 4, a fourth embodiment of the invention is shown and identical reference numerals are given to identical elements. This Figure is very similar to FIG. 3, but shows the connecting rod connecting the piston to the body instead of the suspension arm, as with FIG. 3.

What is claimed is:

1. A suspension system for a vehicle having a body and two wheels on opposite sides thereof, the system comprising a pair of suspension arms for supporting the two wheels, a pivot connecting each suspension arm to the vehicle body, and a pair of struts each arranged for connection between the vehicle body and one of the suspension arms, at a respective distance from the pivot, to control rotation of the suspension arm about its pivot thereby to control vertical movement of the respective wheel relative to the vehicle body, wherein each strut comprises a cylinder and a piston which together define a working chamber having a volume, the piston having a working area and being movable relative to the cylinder to change the volume, the two working chambers are interconnected with each other; the struts are asymmetrically arranged; and the cross sectional areas of the pistons and the distances between the struts and the respective pivots are arranged such that equal vertical movements of the wheels in the same direction produce equal but opposite changes in the volume of the respective working chambers.

2. The suspension system according to claim 1 wherein the pistons have equal working areas and the struts are connected to the suspension arms at equal distances from the respective pivots.

3. The system according to claim 1 wherein each piston has a front side and a back side and the system further comprises a connecting rod extending from the back side of each piston connecting the piston to one of the body and the suspension arm, and the working chambers are on the same side of the respective pistons.

4. The system according to claim 1 wherein each piston divides its cylinder into first and second working chambers, the two first working chambers having an identical cross sectional area and being interconnected and the two second chambers having an identical cross sectional area and being interconnected.

5. The suspension system according to claim 4 further comprising a source of fluid pressure connectable to each pair of interconnected chambers, and control means arranged to control the flow of fluid to and from each pair of chambers to control actively roll of the vehicle.

6. The suspension system according to claim 1 wherein the struts are arranged such that expansion of one of them causes upward movement of its respective wheel relative to the body, and expansion of the other causes downward movement of its respective wheel relative to the body.

7. The suspension system according to claim 1 for a vehicle having a longitudinal axis, wherein the pivots have pivot axes which are arranged to be parallel to said longitudinal axis and the struts are arranged such that expansion of each of them causes rotation of the respective suspension arm in the same direction about its pivot.

8. The suspension according to claim 7 wherein the struts are connected to the suspension arms at points of connection which are both offset from the pivot axis of the respective suspension arm in the same direction.

9. The suspension system according to claim 8 wherein one of the struts is connected to its suspension arm inboard of its pivot and the other is connected to its suspension arm outboard of its pivot.

10. The suspension system according to claim 8 wherein both the struts are arranged to operate in use in a substantially vertical direction and are arranged above the suspension arms.

11. The suspension according to claim 1 wherein both of the struts are arranged substantially horizontally and act on the suspension arms at points above the respective pivot axes.

12. The suspension system according to claim 1 further comprising a source of fluid pressure to which at least one of the pairs of interconnected chambers is connected, and control means arranged to control the flow of fluid to and from said pair of chambers to control actively roll of the vehicle.

* * * * *